United States Patent Office 2,888,438
Patented May 26, 1959

2,888,438
POLYUREAS OF AROMATIC DIAMINES AND AROMATIC DIISOCYANATES

Manfred Katz, Wilmington, Del., assignor to E. I. du Pont de Nemours and Company, Wilmington, Del., a corporation of Delaware No Drawing. Application March 8, 1957
Serial No. 644,748

9 Claims. (Cl. 260—77.5)

This invention relates to novel and useful high-melting soluble polyureas having fiber- and film-forming properties.

Many polyureas have been produced in the past and have found various utilities involving one or more outstanding physical properties. Among these desired properties are high melting point and good solubility in a non-corrosive solvent. The combination of these desirable properties is of great importance since a high-melting polymer, in most cases, cannot be melt-spun because of decomposition at this high temperature level.

It is an object of the present invention to provide high-melting, soluble, fiber- and film-forming polyureas. Another object is the preparation of these polymers by a simple and fast process. A further object is to produce a polyurea in solution which is directly spinnable into an orientable fiber or formable into other shaped articles such as films, rods, bristles, tubes, and the like. Other objects will appear hereinafter.

These objects are accomplished by the present invention which provides a polyurea containing the recurring structural unit:

$$-\overset{O}{\underset{\|}{C}}-NH-A-NH-\overset{O}{\underset{\|}{C}}-NH-A'-NH-$$

wherein A is selected from the group consisting of

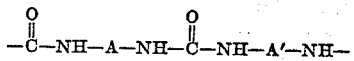

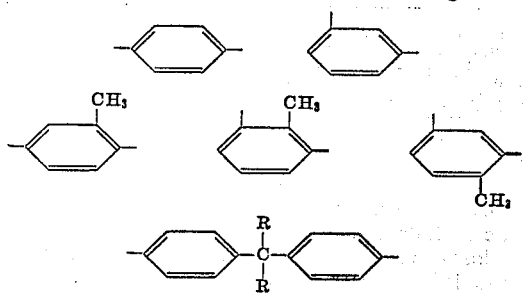

and

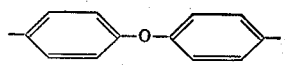

A' is selected from the group consisting of

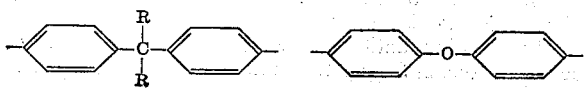

and

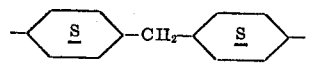

and each R is selected from the group consisting of hydrogen and lower alkyl. These polyureas are all readily soluble in dimethylsulfoxide, dimethylformamide, dimethylacetamide, N-methylpyrrolidone, or in any of these solvents containing about 5% lithium chloride and from such solutions fibers, films and various other articles can be shaped.

The polymers of the present invention may be formed in either of two ways as shown by the following equations:

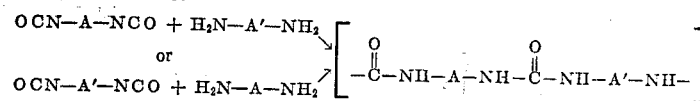

wherein A and A' are as defined above. Thus, the diisocyanate or the diamine compound can contain either the A or A' radical.

The present invention, therefore, provides a process for the formation of polyureas which comprises reacting in a solvent the compounds X—A—X and Y—A'—Y, wherein X and Y are each different complimentary urea-forming radicals selected from the group consisting of —NH$_2$ and —N=C=O and —A— and —A'— are as defined above, at a temperature of from about 0° C. to about 100° C. For this reaction, however, the total number of reactive amine groups should not differ from the total number of isocyanate groups by more than about 5%. The reaction is almost instantaneous and requires only a few seconds to a few minutes for substantial completion at any temperature between about 0° C. and about 100° C.

The solvents which may be used in this reaction are any of those which are inert to the reactants and polymer and will dissolve both reactants at the reaction temperature. Among these may be mentioned acetone, methylene chloride, chloroform, dimethylacetamide, N-methylpyrrolidone, dimethylcyanamide, benzene, nitromethane, chlorobenzene, dimethylsulfoxide, etc. For a spinning solution, however, dimethylformamide, dimethylacetamide, dimethylsulfoxide, N-methylpyrrolidone, and dimethylformamide or dimethylacetamide containing up to about 5% of lithium chloride are preferred. In the preferred embodiment, the reaction is performed at room temperature with the reactants being dissolved in dimethylformamide or dimethylformamide containing lithium chloride) to such an extent that the resulting solution contains at least 5%, but preferably 20% or more, of the polymer and is suitable for the spinning of fibers or casting of films with little or no further concentration.

Mixtures of each of the two reactants (i.e., the diamine and/or diisocyanate) may also be employed in the reaction to form copolymers which correspond to the above formula, but contain different recurring structural units. Thus, when one of the monomers is bis(4-aminocyclohexyl)methane, mixtures of the following diisocyanates may be used: bis(4-isocyanatophenyl)di-lower alkyl methane, bis(4 - isocyanatophenyl)lower alkyl methane, bis(4 - isocyanatophenyl)methane, bis(4 - isocyanatophenyl)ether, 2,4-(2,5 or 2,6)tolylene diisocyanate and m- or p-phenylene diisocyanate. Similarly when one of the monomers is bis(4-isocyanatophenyl)ether, mixtures of the following diamines may be used: bis(4-aminophenyl)ether, bis(4-aminophenyl)methane, bis(4-aminophenyl)di-lower alkyl methane, bis(4-aminophenyl)lower alkyl methane, bis(4-aminocyclohexyl)methane, 2,4-(2,5 or 2,6)-tolylene diamine and m- or p-phenylene diamine. Mixtures of both reactants may also be used for the formation of other copolyureas. When such mixtures of the diisocyanates and/or diamines are used, however, the sum total of the reactive groups of the diisocyanate compounds should be substantially equal to the sum total of the reactive groups of the diamine compounds (i.e., substantially equimolecular amounts of both reactants should be used). In addition, monomers or mixtures of monomers, such as hexamethylene diamine, ethylene diamine, hydrazine, benzidine, decamethylene diisocyanate, etc., may be substituted in amounts of up to about 20% for the X—A—X and Y—A'—Y reactants defined above.

The invention is illustrated by the following examples in which the inherent viscosities are measured at room temperature and the given melting points indicate the lowest temperature at which a fresh polymer sample leaves a wet molten trail as it is stroked with moderate pressure across a clean heated metal surface such as a brass block.

*Example 1*

In a centrifuge bottle 22.63 g. (0.10 mol.) of 2,2-bis(4-aminophenyl)propane (M.P. 131–2° C.) is stirred in 29 g. of dimethylformamide until a clear solution is formed. To this is added, at room temperature, a solution of 27.83 g. (0.10 mol.) of 2,2-bis(4-isocyanatophenyl)propane (M.P. 90–92° C.) in 64 g. of dimethylformamide within 30 seconds. The solution becomes hot and viscous and contains about 35% solids. Approximately 20 g. of dimethylformamide is evaporated under vacuum after which the solution begins to gel. It is then centrifuged and subsequently dry-spun through a 5 hole spinneret (each hole having a 0.004" diameter) using conventional dry-spinning apparatus and the following conditions: head temperature 125° C., spinning pressure 100 p.s.i., spinneret temperature 130° C., air temperature 178° C., wind-up speed 173 y.p.m. and a spin stretch factor of 2.1. The polymer has an inherent viscosity of 0.33 in dimethylformamide. The spun filament, after boiling for 15 minutes in water and drawing to 2.25 times its extruded length in 10 lbs. steam pressure, has a fiber sticking temperature of 252° C. while the polymer itself melts at 321° C. The undrawn fiber, when redissolved in dimethylformamide, has an inherent viscosity of 0.41. Properties of the drawn fibers are given in the following table in which the figures represent tenacity T, elongation E, and initial modulus $M_1$ for the straight fiber, its knots, and its loops. The fibers are amorphous, have a work recovery of 77% from 3% elongation and a tensile recovery of 87% from 5% elongation.

|  | T. in g.p.d. | E. in percent | $M_1$ in g.p.d. |
| --- | --- | --- | --- |
| Straight | 3.0 | 25 | 39 |
| Loop | 1.7 | 8.4 | 36 |
| Knot | 2.9 | 22 | 40 |

The same properties measured on the wet fiber at 21° C. are:

|  | T. in g.p.d. | E. in percent | $M_1$ in g.p.d. |
| --- | --- | --- | --- |
| Straight | 2.3 | 22 | 37 |
| Loop | 1.5 | 8 | 35 |
| Knot | 2.4 | 27 | 32 | and on the web fiber at 90° C.

|  | T. in g.p.d. | E. in percent | $M_1$ in g.p.d. |
| --- | --- | --- | --- |
| Straight | 1.8 | 29 | 30 |
| Loop | 1.5 | 14 | 29 |
| Knot | 1.9 | 32 | 23 |

*Example II*

15.05 g. (0.0665 mol.) of 2,2-bis(4-aminophenyl)propane in 37 g. of dimethylformamide and 16.64 g. (0.0665 mol.) of bis(4-isocyanatophenyl)methane in 37 g. dimethylformamide are stirred together rapidly at room temperature for 30 minutes yielding a solution containing 30% polymer and having an inherent viscosity of 0.63 in dimethylformamide. The properties of a fiber, spun by the method of Example I, when boiled for 30 minutes in water and drawn 2.0 times its extruded length in 10 lbs. steam pressure are listed in the table below. The work recovery under 3% elongation is 69%, the tensile recovery under 5% elongation is 88%. The polymer is amorphous and has a melting point of 307° C. The fiber sticking temperature is 250° C. and the drawn fiber shrinks 5% in boiling water.

|  | T. in g.p.d. | E. in percent | $M_1$ in g.p.d. |
| --- | --- | --- | --- |
| Straight, dry, 21° | 2.9 | 37 | 37 |
| Loop, dry, 21° | 1.9 | 14 | 35 |
| Knot, dry, 21° | 2.7 | 31 | 26 |
| Straight, wet, 21° | 2.5 | 40 | 31 |
| Loop, wet, 21° | 1.7 | 15 | 31 |
| Knot, wet, 21° | 2.2 | 33 | 28 |
| Straight, wet, 90° | 1.5 | 42 | 19 |
| Loop, wet, 90° | 1.4 | 31 | 18 |
| Knot, wet, 90° | 1.6 | 45 | 13 |

*Example III*

23.14 g. (0.11 mol.) of bis(4-aminocyclohexyl)methane in 65 g. of dimethylformamide is placed in the spinning head of a conventional dry-spinning apparatus. A solution of 27.5 g. (0.11 mol.) of bis(4-isocyanatophenyl)methane in 65 g. of dimethylformamide is added rapidly at room temperature, which causes considerable heat evolution. The solution attains a spinning viscosity in from 5 to 10 minutes. The polymer has an inherent viscosity of 0.63 in dimethylformamide and is spun directly into fibers according to the procedure of Example I. The amorphous fiber is then drawn to 1.75 times its extruded length in 10 lbs. steam pressure. It has a work recovery of 79% from 3% elongation and a tensile recovery of 92% from 5% elongation. Other properties are listed in the table:

|  | T. in g.p.d. | E. in percent | $M_1$ in g.p.d. |
| --- | --- | --- | --- |
| Straight, dry, 21° | 2.5 | 32 | 31 |
| Loop, dry, 21° | 1.1 | 5.9 | 30 |
| Knot, dry 21° | 2.0 | 16 | 24 |
| Straight, wet, 21° | 2.2 | 32 | 30 |
| Loop, wet, 21° | 1.1 | 5.5 | 26 |
| Knot, wet, 21° | 1.8 | 9.4 | 31 |
| Straight, wet, 90° | 1.4 | 38 | 23 |
| Loop, wet, 90° | 0.98 | 13 | 20 |
| Knot, wet, 90° | 1.3 | 30 | 19 |

A fiber sample, when boiled for 1 hour in 1% hydrochloric acid, does not show any loss in tenacity and only a 3% loss of elongation. Another sample, boiled for one hour in 1% caustic, similarly shows no loss in tenacity and only a 6% loss of elongation.

*Example IV*

2.78 g. (0.01 mol.) of 2,2-bis(4-isocyanatophenyl)-propane in 10 g. of dimethylformamide is added to 2.00 g. (0.01 mol.) of bis(4-aminophenyl)ether in 10 g. of dimethylformamide at room temperature. The mixture is stirred rapidly until homogeneous and the solution becomes viscous in from 3 to 6 minutes. The polyurea has an inherent viscosity of 0.43 in this solvent and the solution is cast into a flexible film. The solution is spun into a fiber following the technique of Example I. The polymer melting point is 305° C.

Example V

A solution of 2.78 g. (0.01 mol.) of 2,2-bis(4-isocyanatophenyl)propane in 14 g. of dimethylformamide is added at room temperature to a solution of 2.10 g. (0.01 mol.) of bis(4-aminocyclohexyl)methane in 5 g. of dimethylformamide. The solution becomes hot and viscous in from 3 to 6 minutes and a tough, flexible film is cast directly from it. The inherent viscosity of the polyurea in dimethylformamide is 0.85 and the melt temperature 315° C.

Example VI

A solvent consisting of dimethylformamide containing 5% by weight of lithium chloride is prepared by stirring the ingredients at room temperature until homogeneous. 50 g. (0.20 mol.) of bis(4-isocyanatophenyl)methane is dissolved in 109 g. of the above solvent. This solution is added to a solution of 39.6 g. (0.20 mol.) of bis(4-aminophenyl)methane in 100 g. of the above solvent and the solution is spun through a 5-hole spinneret (each hole having a 0.004" diameter) using a conventional dry-spinning apparatus and the following conditions: head temperature 120° C., spinning pressure 180 p.s.i., spinneret temperature 110° C., air temperature 220° C., wind-up speed 183 yards per minute and a spin-stretch factor of 2.1. The yarn is dried at 150° C., in a vacuum oven for 25 minutes, extracted in cold water overnight, air dried at room temperature, and drawn 3.5 times its extruded length over a hot pin of 225° C. The tenacity of the yarn is 3.3 g.p.d., its elongation 18%, and its initial modulus 48 g.p.d. The yarn has an inherent viscosity of 0.76 in dimethylformamide containing 5% lithium chloride by weight, and shows low crystallinity by X-ray.

Example VII 4.00 g. (0.0177 mol.) of 2,2-bis-(4-aminophenyl)propane and 1.00 g. (0.0086 mol.) of hexamethylene diamine are mixed with 19 g. of dimethylformamide containing 5% lithium chloride. The mixture is warmed to give a clear solution, and cooled to room temperature again. A solution of 6.70 g. (0.0263 mol.) of bis(4-isocyanatophenyl)methane in 25 g. of dimethylformamide containing 5% lithium chloride is added to yield a viscous solution from which a tough film is cast. The polymer melts at 334° C. and has an inherent viscosity of 0.78 in dimethylformamide containing 5% lithium chloride. This copolymer contains 80% of the homopolymer described in Example II.

Example VIII

A solution of 1.74 g. (0.01 mol. of 2,4-tolylene diisocyanate in 3 g. of dimethylformamide is added at room temperature to a solution of 2.26 g. (0.01 mol.) of 2,2-bis(4-aminophenyl)propane in 6 g. dimethylformamide. The solution warms up to somewhat above room temperature (about 40° C.) and is cast into a flexible film. The polymer melts at 309° C., and has an inherent viscosity of 0.69 in dimethylformamide.

Example IX

A solution of 2.50 g. (0.01 mol.) of bis(4-isocyanatophenyl)methane in 16 g. of dimethylformamide is added at room temperature to a solution of 1.08 grams (0.01 mol.) of p-phenylenediamine in 16 g. of dimethylformamide. The polymer precipitates at once and is quenched in water, filtered, and boiled for 20 minutes in water. The polymer when dry is soluble in dimethylformamide containing 5% by weight of lithium chloride and the inherent viscosity in this solvent is 0.36. The viscous solution is cast into a flexible film. The polymer melt temperature is found to be above 400° C., but decomposition occurs at this temperature.

Example X

A solution of 1.74 g. (0.01 mol.) of 2,6-tolylene diisocyanate in 10 g. of dimethylformamide is added at room temperature to a solution of 1.98 g. (0.01 mol.) of bis(4-aminophenyl)methane in 11 g. of dimethylformamide. The polymer precipitates in about 10 seconds and is then quenched and boiled off. The polymer when dry is soluble in dimethylformamide containing 5% by weight lithium chloride and the inherent viscosity in this solvent is 0.66. A flexible film is cast from the solution. The polymer melt temperature lies above its decomposition temperature of 382° C.

Example XI

A solution of 2.50 g. (0.01 mol.) of bis(4-isocyanatophenyl)methane in 10 g. of dimethylformamide is added at room temperature to a solution of 1.22 g. (0.01 mol.) of 2,5-tolylene diamine in 11 g. of dimethylformamide. The polymer precipitates at once. 1.1 g. of lithium chloride (approximately 5% by weight of the dimethylformamide is then added to the mixture whereupon all the polymer dissolves to form a viscous dope. A tough film is cast from this solution. The inherent viscosity of the quenched and boiled off polymer is 1.60 in dimethylformamide containing 5% lithium chloride. The polymer melts at 395° C. with decomposition.

Example XII

To a solution of 2.16 g. (0.020 mol.) of m-phenylene diamine in 143 g. of dioxane is added at room temperature to a solution of 5.0 g. (0.020 mol.) of bis(4-isocyanatophenyl)methane in 44 g. benzene. The polymer precipitates immediately. It has an inherent viscosity of 0.24 in concentrated sulfuric acid. The polymer dissolves readily in cold dimethylformamide containing 5% by weight of lithium chloride. A film is cast from the solution. The polymer decomposes when heated to 359° C.

Example XIII

A solution of 3.05 g. (0.025 mol.) of 2,4-tolylene diisocyanate in 24 g. of dimethylformamide is added at room temperature to a solution of 2.0 g. (0.025 mol.) of bis(4-aminophenyl)ether in 24 g. of dimethylformamide. A tough flexible film is cast directly from the resulting viscous solution. The inherent viscosity of the film in sulfuric acid is 0.40 and the polymer melt temperature 320° C.

Example XIV 1.74 g. (0.01 mol.) of 2,6-tolylene diisocyanate is dissolved in 5 g. of dimethylformamide. To this is added a solution of 2.10 g. (0.01 mol.) of bis(4-aminocyclohexyl)methane in 10 g. of dimethylformamide. The solution warms up slightly and the polymer precipitates immediately. The polymer dissolves in dimethylformamide containing 5% by weight of lithium chloride. A tough film is cast from the solution. The polymer has a sticking temperature of 317° C. By replacing 2,6-tolylene diisocyanate with 2,4-tolylene diisocyanate, a similar polymer and film is obtained.

Examples of other diisocyanates that may replace those given in the examples are as follows: 1,1-bis(4-isocyanatophenyl)propane; 2,2-bis(4-isocyanatophenyl)pentane; 2,2-bis(4-isocyanatophenyl)butane; 3,3-bis(4-isocyanatophenyl)hexane; 3,3-bis-(4-isocyanatophenyl)heptane; 4,4-bis(4-isocyanatophenyl)heptane; bis(4-isocyanatophenyl)ether; 2,4-(2,5 or 2,6)-tolylene diisocyanate; m- or p-phenylene diisocyanate; etc. As particular examples of other diamines there may be mentioned: 1,1-bis(4-aminophenyl)ethane; 1,1-bis(4-aminophenyl)butane; 2,2-bis(4-aminophenyl)hexane; 3,3-bis-(4-aminophenyl)pentane; 3,3-bis(4-aminophenyl)heptane;

2,2-bis(4-aminophenyl)heptane; bis(4-aminophenyl)-ether; bis(4-aminocyclohexyl)methane; 2,4-(2,5 or 2,6)-tolylene diamine; m- or p-phenylene diamine; etc. The reactants, however, are so chosen that one reactant contains the A radical and the other the A' radical as is hereinbefore pointed out.

The main advantage of the polymers of this invention is their solubility since polyureas generally are insoluble in neutral solvents and can be wet-spun only from strongly acid spin dopes. Use can be made of the surprising solubility of the hereinbefore described polymers in dimethylsulfoxide, N-methylpyrrolidone, dimethylformamide, dimethyl acetamide, or in any of these solvents containing about 5% lithium chloride by making shaped articles directly from the preparation solution without first separating the polymer and redissolving it in a different solvent. As shown by the examples of the disclosure, fibers may be formed from the preparation solutions by the use of conventional dry-spinning procedures wherein the solution is extruded through a multi-hole spinneret into a heated atmosphere. The preparation, of course, can be done in a continuous manner, e.g., by combining the two monomer solutions at one end of a polymerization vessel and spinning the fiber continuously through a spinneret at the other end, to which the viscous solution is forwarded by mechanical means.

The new polymers have excellent fiber- and film-forming properties and are high to very high melting. The importance of these properties is well recognized in the synthetic textile trade. The solubility of these new polyureas makes their preparation simpler, faster, and more economical. The fibers spun from the polyurea preparation solutions have excellent transverse and "hot-wet" properties. Among the utilities for these new fibers and other shaped articles and structures produced by the polymer, only a few are mentioned to illustrate their usefulness in many and various fields: sewing threads, press pad covers, brushes, clothing, reinforcements for plastics and other uses where high sticking temperatures and toughness are required.

A dyestuff or pigment may also be mixed into the polymer solution in order to produce colored structures.

Many modifications will be apparent to those skilled in the art from the reading of the above without a departure from the inventive concept.

What is claimed is:

1. A synthetic, linear, high-melting, fiber-forming polyurea containing at least about 80% of the recurring structural unit $$-\overset{O}{\underset{\|}{C}}-NH-A-NH-\overset{O}{\underset{\|}{C}}-NH-A'-NH-$$

wherein A is selected from the group consisting of

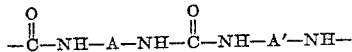

and

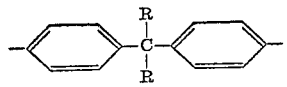

A' is selected from the group consisting of

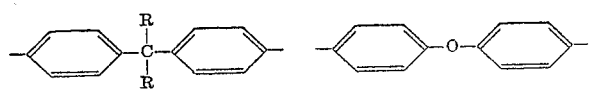

and

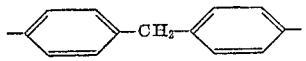

and each R is selected from the group consisting of hydrogen and lower alkyl.

2. The polyurea of claim 1 wherein both A and A' are

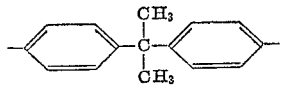

3. The polyurea of claim 1 wherein A is

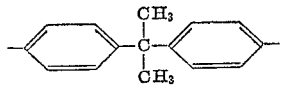

and A' is

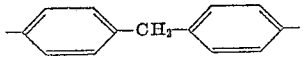

4. The polyurea of claim 1 wherein A is

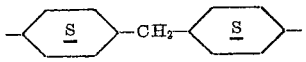

and A' is

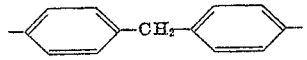

5. The polyurea of claim 1 wherein both A and A' are

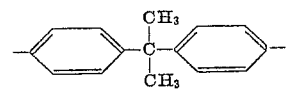

6. The polyurea of claim 1 wherein A is

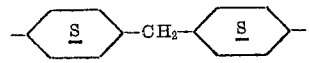

and A' is

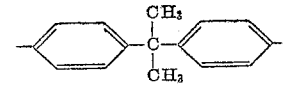

7. A process for the formation of a polyurea which comprises reacting in a solvent the compounds X—A—X and Y—A'—Y, wherein X and Y are each different complementary urea-forming radicals selected from the group consisting of —NH₂ and —N=C=O, A is selected from the group consisting of

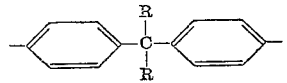

and

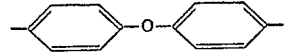

A' is selected from the group consisting of

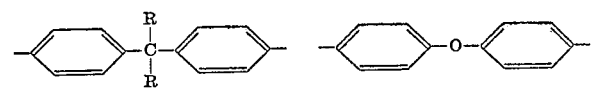

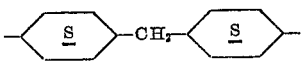

and each R is selected from the group consisting of hydrogen and lower alkyl, at a temperature of from about 0° C. to about 100° C.

8. The process of claim 7 wherein the reaction is carried out at room temperature.

9. The process of claim 7 wherein the reaction is carried out in a dimethylformamide containing about 5% lithium chloride.

References Cited in the file of this patent

UNITED STATES PATENTS

| | | |
|---|---|---|
| 2,284,896 | Hanford et al. | June 2, 1942 |
| 2,292,443 | Hanford | Aug. 11, 1942 |
| 2,359,877 | Schupp | Oct. 10, 1944 |
| 2,511,544 | Rinke et al. | June 13, 1950 |

UNITED STATES PATENT OFFICE
CERTIFICATE OF CORRECTION

May 26, 1959

Patent No. 2,888,438

Manfred Katz

It is hereby certified that error appears in the printed specification of the above numbered patent requiring correction and that the said Letters Patent should read as corrected below.

Column 2, line 55, for "or dimethylformamide" read --(or dimethylformamide --; line 57, after "20%" insert -- to 30% --; column 4, line 10, for "(0.0665 mol." read -- (0.0665 mol.) --.

Signed and sealed this 6th day of October 1959.

(SEAL)
Attest:

KARL H. AXLINE
Attesting Officer

ROBERT C. WATSON
Commissioner of Patents